US008855634B2

(12) United States Patent
Klatt

(10) Patent No.: US 8,855,634 B2
(45) Date of Patent: Oct. 7, 2014

(54) METHOD AND ARRANGEMENT FOR OPTIMIZING THE OPERATIONAL TIMES AND CELL EXCHANGE PERFORMANCE OF MOBILE TERMINALS

(75) Inventor: Axel Klatt, Köln (DE)

(73) Assignee: T-Mobile International AG & Co. KG, Bonn (DE)

( * ) Notice: Subject to any disclaimer, the term of this patent is extended or adjusted under 35 U.S.C. 154(b) by 997 days.

(21) Appl. No.: 11/996,089

(22) PCT Filed: Jul. 12, 2006

(86) PCT No.: PCT/DE2006/001203
§ 371 (c)(1),
(2), (4) Date: May 20, 2008

(87) PCT Pub. No.: WO2007/009433
PCT Pub. Date: Jan. 25, 2007

(65) Prior Publication Data
US 2008/0233959 A1    Sep. 25, 2008

(30) Foreign Application Priority Data

Jul. 21, 2005   (DE) .......................... 10 2005 034 750
Jul. 21, 2005   (DE) .......................... 10 2005 034 760
Aug. 1, 2005    (DE) .......................... 10 2005 036 583

(51) Int. Cl.
*H04W 4/00*      (2009.01)
*H04W 36/36*     (2009.01)
*H04W 36/00*     (2009.01)
*H04W 36/30*     (2009.01)

(52) U.S. Cl.
CPC .............. *H04W 36/36* (2013.01); *H04W 36/00* (2013.01); *H04W 36/30* (2013.01)
USPC .......................... 455/435.1; 455/436; 455/437

(58) Field of Classification Search
USPC ........................ 455/435.1, 436, 437
See application file for complete search history.

(56) References Cited

U.S. PATENT DOCUMENTS 5,732,360 A    3/1998  Jarett et al.
6,387,027 B1 *  5/2002  Bodin ........................... 455/419

(Continued)

FOREIGN PATENT DOCUMENTS

DE    103 02 404    8/2004
DE    103 56 661    7/2005

(Continued)

OTHER PUBLICATIONS

English language abstract together with foreign patent document.

(Continued)

*Primary Examiner* — Charles Appiah
*Assistant Examiner* — Jaime Holliday
(74) *Attorney, Agent, or Firm* — Faegre Baker Daniels LLP

(57) ABSTRACT

The invention at hand involves a method and an arrangement for optimizing the operational times and cell exchange performance of mobile terminals in a mobile communication network having adjacent radio cells. The mobile terminal temporarily stores network specific characteristics for adjacent radio cells which are not suitable for cell exchange when the mobile communication network is in operation and it uses said characteristics as decision criteria for cell exchange, and said information is used, in particular, to exclude said adjacent radio cells from additional radio technical measurements and identification methods. By implementing the terminal performance according to the inventive method, it is possible to significantly increase the operational times and the cell exchange performance of a mobile terminal in specific situations and to improve the service for a mobile radio customer. The inventive device can also be used for mobile terminals according to GSM or UMTS standard, and also for other radio network technology (for example, wireless LAN (W-LAN), cdma2000, WiMAX, WiBro, enhanced UTRAN, etc.).

18 Claims, 1 Drawing Sheet

(56) References Cited

U.S. PATENT DOCUMENTS

| | | | |
|---|---|---|---|
| 6,546,250 B1* | 4/2003 | Turcotte et al. | 455/437 |
| 7,738,922 B2 | 6/2010 | Hashimoto | |
| 2002/0111180 A1 | 8/2002 | Hogan et al. | |
| 2002/0123348 A1* | 9/2002 | Willars et al. | 455/436 |
| 2003/0040313 A1* | 2/2003 | Hogan et al. | 455/435 |
| 2003/0190916 A1* | 10/2003 | Celedon et al. | 455/437 |
| 2004/0157600 A1* | 8/2004 | Stumpert et al. | 455/432.1 |
| 2004/0203775 A1* | 10/2004 | Bourdeaut et al. | 455/435.1 |
| 2005/0101323 A1 | 5/2005 | DeBeer | |
| 2006/0246890 A1 | 11/2006 | Yasuda et al. | |

FOREIGN PATENT DOCUMENTS

| | | |
|---|---|---|
| EP | 0 858 237 | 8/1998 |
| EP | 0 951 190 | 10/1999 |
| EP | 1 286 561 | 2/2003 |
| JP | 2005-109570 | 4/2005 |
| JP | 2006-311329 | 11/2006 |
| WO | 02/11485 | 2/2002 |
| WO | 2004/066543 | 8/2004 |
| WO | 2005/048631 | 5/2005 |

OTHER PUBLICATIONS

3GPP TS 24.008, "3rd Generation Partnership Project; Technical Specification Group Core Network and Terminals; Mobile radio interface Layer 3 specification; Core network protocols; Stage 3", Release 7 (2005).

3GPP TS 25.304, "3rd Generation Partnership Project; Technical Specification Group Radio Access Network; User Equipment (UE) procedures in idle mode and procedures for cell reselection in connected mode", Release 6 (2005).

English language translation of International Preliminary Report on Patentability in corresponding PCT Application No. PCT/DE2006/001203.

German Office Action dated Aug. 13, 2009 in German Application No. DE 06 761 789.4 with English language translation of same.

German Office Action dated Jun. 19, 2008 in corresponding German Application No. 10 2005 036 583.5 with English language translation of same.

"Universal Mobile Telecommunications System (UMTS)", ETSI Standards, European Telecommunications Standards Institute, Sophia-Antipo, FR, bd. 3-R2, Nr. V660, Jun. 2005, XP014030557 ISSN: 0000-001, see paragraphs 5.2.2 and 5.3.1.1.

Office Action dated Jun. 19, 2006 in corresponding German Application No. 10 2005 036 583.3.

Office Action dated Oct. 6, 2011 in corresponding Japanese Application No. 2008-521794.

3GPP TS 25.133, 3rd Generation Partnership Project; Technical Specification Group Radio Access Network; Requirements for support of radio resource management (FDD) (Release 1999).

German Office Action dated Jun. 9, 2011 in corresponding German Application No. 10 2005 036 583.3.

Decision to Grant dated Mar. 26, 2012 in corresponding Japanese Patent Application No. 2008-521794.

* cited by examiner

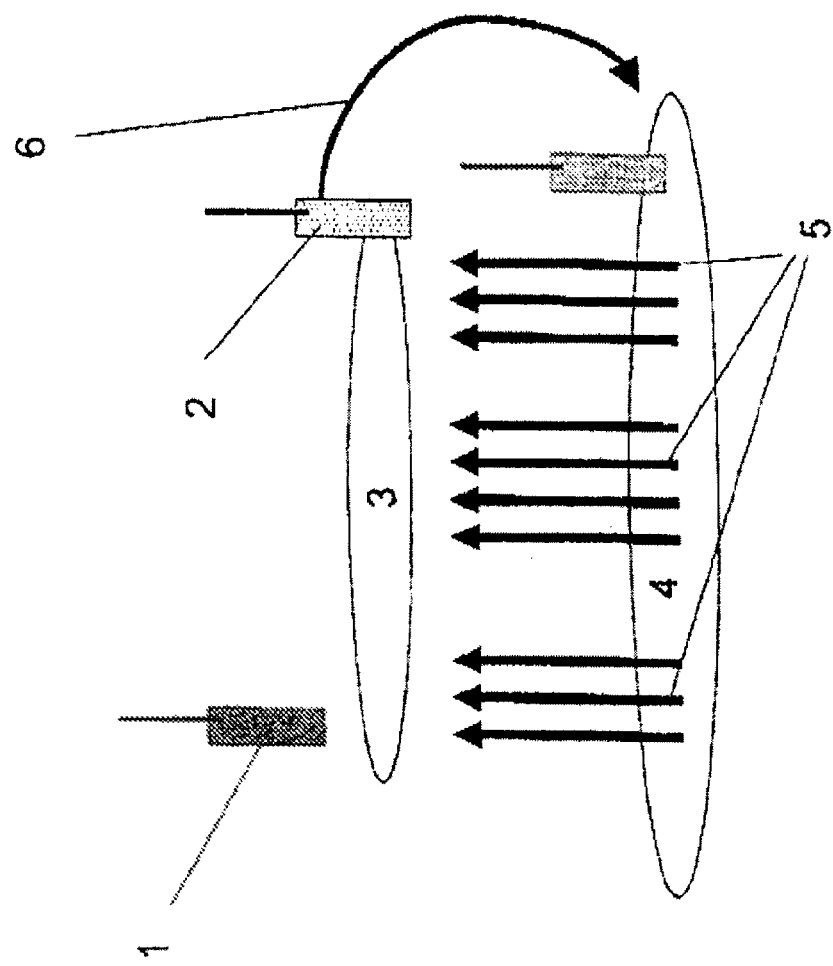

METHOD AND ARRANGEMENT FOR OPTIMIZING THE OPERATIONAL TIMES AND CELL EXCHANGE PERFORMANCE OF MOBILE TERMINALS

CROSS REFERENCE TO RELATED APPLICATION

This application is related to and claims the benefit under 35 U.S.C. §119 and 35 U.S.C. §365 of International Application No. PCT/DE2006/001203, filed Jul. 12, 2006.

The invention at hand involves a method and an arrangement for optimizing the operational times and cell exchange performance of mobile terminals, as used in a cellular mobile communication network, for example according to GSM or UMTS Standard.

In cellular mobile networks according to GSM standard as well as UMTS standard, as defined by 3GPP [www.3gpp.org], cell exchange occurs in so-called idle mode or in specific stages of connected mode with UMTS (URA_PCH, CELL_PCH and CELL_FACH) through mobile radio unit based cell exchange algorithm. The same applies to cell exchange in packet-based GPRS. For this cell exchange, the radio network informs via the so-called radio channel (BCCH) the respective terminal via potential adjacent radio cells.

The network operator is obliged to control the emitted adjacent radio cells. In this connection, quite a number of possible proximity relationships can be emitted which can include also adjacent radio cells of a different radio access technology (GSM, UMTS, cdma2000) or frequencies (for example with UMTS). Expansions for existing mobile radio technology can also allow for a disclosure of further technologies (for example WLAN, WiMAX, etc.) on the radio channel of, for example, UMTS [DE10302404A1].

The following specifications regarding prior art apply primarily to a use according to GSM and UMTS standard. According to 3GPP standard, mobile terminals are required to measure configured adjacent radio cells continuously or with a defined period type in order to initiate a potential cell exchange to a radio technically improved cell. The details of this requirement are defined for GSM mobile radio units in [3GPP TS 45.008] and for UMTS mobile radio units in [3GPP TS 25.304, TS 25.133 and TS 25.331]. The above-mentioned technical specifications also describe when a cell exchange has to be performed and which criteria of the potential target cell has to be fulfilled so that a cell exchange may indeed be performed through the mobile terminal.

Moreover, these technical specifications define what further procedures must be performed after a cell exchange, for example, the performance of the so-called CELL UPDATE procedure in a UMTS system for mobile terminals in RRC connected mode status CELL_PCH.

The preceding description of prior art refers only to the radio part (AS-access stratum) of a cellular mobile network.

The core network (CN) located behind the radio network provides further procedures and requirements for the performance of mobile terminals: the management of mobility of a mobile radio unit is managed according to the status of the mobile terminal through the core network or radio network, respectively (idle vs. connected mode). In the technical standards according to 3GPP, the term is MM—mobility-management in "non access stratum" (NAS). In order to manage mobility through the core network, a cellular mobile radio system is divided in so-called location areas (LA) and routing areas (RA).

If a mobile terminal registers with the core network for the first time ("attach" procedure), the location of the mobile terminal is known to the core network with the granularity of the location area. For a (vernacular) call (mobile terminated call—MTC) programmed for the mobile terminal, the CS (circuit switched) core network—here the so-called mobile switching center (MSC)—performs a paging procedure throughout the entire location area to which the called mobile terminal has to respond with defined procures [3GPP TS 24.008].

For packet-oriented (PS) data circuits, the routing area (RA) concept is used. This mobility management principle is comparable to the location area principle. However, it is controlled by a core network element programmed for the packet-oriented data communication—the "serving gateway serving node"—SGSN. The rules and procedures are described in detail in [3GPP TS 23.060].

A further basic principle for the CS (MCS) as well as for the PS (SGSN) is that the mobility of a mobile terminal is controlled on LA or RA granularity, respectively and, in case of a exchange of LA or RA, mobile terminals must inform the respective core network element (MSC or SGSN) of the exchange performed. These procedures are called location area update (LAU) and routing area update (RAU).

In mobile radio systems according to GSM or UMTS standard, there is also the possibility to prevent a mobile terminal from having access to specific location or routing areas through the core network (NAS). For this, the core network has the possibility of rejecting a location or routing area update of a mobile terminal, whereupon the core network informs the mobile terminal of the reason for rejection. This method is defined in [3GPP TS 24.008] and is called location registration reject.

[3GPP TS 24.008] defines also a number of reasons for rejection and the resulting consequences and requirements for a mobile terminal.

Procedures required on the part of a mobile terminal after LAU rejection are, for example, the performance of a PLMN selection upon receiving reason #13 (i.e., searching a new network operator (PLMN)), searching a different adjacent radio cell within a different location/routing area upon receiving a rejection with reasons #14, or #15, etc. . . . For details, reference is made to [3GPP TS 24.008].

According to 3GPP specifications, the rejection of location area updates through the core network has also an effect on the performance of the mobile terminal in selecting potential target cells in the radio network:

According to TS 25.304 and TS 45.008, mobile terminals are only allowed to select an adjacent radio cell for cell exchange if the cell fulfills specific requirements. For instance, a cell selected as a candidate for a potential cell exchange must belong to the actively used PLMN (that is, it must have the same PLMN identity as the actively used cell—a special in this regard is the concept of "equivalent PLMNs" (ePLMN), which allows the mobile terminal under certain conditions to exchange to another PLMN as if these adjacent radio cells would belong to the actively used PLMN [TS 24.008]).

Other necessary requirements for changing to a target cell are that the target cell may not be barred ("barred cell"), may not be reserved for one particular operator (only UMTS) ("operated reserved cell") and, finally, may not be included in the "list of forbidden location areas for roaming" [TS 25.304]. This list includes all location area identities in which a location area update for an initiated cell exchange has once been rejected.

A particular disadvantage of recent prior art is the fact that, neither according to GSM nor according to UMTS standard, a mobile terminal includes sufficient information about adjacent radio cells in the active cell to inhibit radio technical measurements and identification of the potential target cell.

In order to detect whether an adjacent radio cell (which has been disclosed to ALL mobile terminals as potential target for a cell exchange by means of cell reselection via the radio channel of the actively used cell) fulfills the necessary requirements for a cell exchange, the mobile terminal must synchronize with the potential target cell after its measurement and select its radio channel (BCCH) in order to extract the required information (PLMN ID of the target cell, respective location or routing area identity, "barred status," other cell characteristics, . . . ).

For reasons of capacity, it has been deliberately avoided to emit this information in the actual source cell. It has to be taken into consideration that, according to recent prior art, the information required for a cell exchange controlled by the mobile terminal is provided via the radio channel of a cell, and this information is the same for all mobile terminals located in this cell.

Consequently, according to recent prior art it is not necessarily possible to provide different mobile terminals with different proximity information via the radio channel.

It should be noted that the qualifications of the potential adjacent radio cell can be different/specific for each mobile terminal (some mobile terminals are restricted from access to certain location areas, others are not). The latter case is mainly defined from the requirements of the network operators and can be designed differently in different mobile networks.

BRIEF DESCRIPTION OF THE DRAWING

FIG. 1 illustrates an arrangement for optimizing the operational times and cell exchange performance of mobile terminals.

Pamphlet US 2002/0123348 A1 discloses a method to be used in a radio network. Said radio network features radio cells suitable to be used by cell user equipment in operation and accepted by a second operator radio network. The method features an addressing as a restricted radio cell, each radio cell of the first operator network features a competitive cell and the rejection of a utilization attempt by the cell user equipment, which is accepted by a second operator network of the rejected radio cell.

This pamphlet has the disadvantage that, in order to avoid unnecessary measurements of adjacent radio cells, no information is stored via specific target cells, which, in turn, prevents further measurements of potential target cell(s) of configured adjacent radio cells.

Pamphlet EP 1 286 561 A1 discloses a method for selection of a new geographical transmission range for a mobile radio connection, at which a radio network access receives information from a list of one or several transmission ranges, which include mobile services or no services, and the information received for requesting the service of a new transmission range are examined, at which the selection of a geographical transmission range is determined on the basis of the information received.

Also this pamphlet has the disadvantage that, in order to avoid unnecessary transmission of information, no information is stored, which, in turn, prevents further requests and transmission of potential radio network accesses for a radio connection.

The objective of the invention is to provide a method for optimizing the operational times and cell exchange performance of mobile terminals which offers the possibility that different mobile terminals use and store for cell reselection different proximity information (which are provided via radio channel).

According to the invention, this objective is achieved by a method having the characteristics of patent claim 1.

Advantageous embodiments and developments of the invention-based method are mentioned in the respective sub-claims.

Basically the invention is based on reducing the number of measurements the activated mobile terminal has to perform and, consequently, inhibiting in particular the radio technical measurements and procedures required to identify the characteristics of cells which are not suitable candidates for cell exchange.

The invention at hand represents a significant improvement of prior art since it makes it possible to prevent radio technical measurements of adjacent radio cells if a mobile terminal according to GSM or UMTS standard has already examined the qualification as potential target cell of this adjacent radio cell and has determined that it is not suitable as target cell for this mobile terminal.

The reasons why the target cell is not suitable for the mobile terminal are listed in prior art.

In the embodiment, the suggested method applies primarily to a case in which the target cell is not suitable for cell exchange since access to this cell through a location or routing area update via the core network has already been rejected.

As an alternative embodiment, it can also be applied to a case in which the target cell belongs, for example, to a different PLMN, the target cell is "barred" or marked as "reserved for network operators."

The subsequent explanations describe an exemplified embodiment of the invention-based method.

A national roaming agreement between two mobile network operators with different PLMN identity within one country is used as a starting point of an embodiment of the invention-based method.

For instance, this national roaming agreement allows the customers of operator B (PLMN B) 2 to roam in the areas of operator A (PLMN A) 1 (that is, to make use of mobile network services of operator A), where operator B does not supply his own mobile network provisions. This embodiment also arranges, for example, that operator A 2 operates a mobile network according to GSM as well as UMTS standard. This operator has configured his GSM network 4 in such a way that a mobile terminal, which supports GSM as well as UMTS, automatically exchanges to UMTS 3 in areas where operator A supplies UMTS provisions 3 without a need for the mobile radio user to interfere (by UE based cell reselection 5). This arrangement is shown in FIG. 1.

The automatic exchange from so-called dual-mode mobile terminals (dual-mode UEs)—that is, devices supporting GSM as well as UMTS—is made possible by emitting proximity information via the UMTS network in the GSM network in areas in which an UMTS network lies above the GSM network. It has to be taken into consideration that with this parameterization typical for current combined GSM/UMTS networks ALL dual-mode UEs of cell reselection (that is, UE based cell exchanges) follow from GSM to UMTS as soon as the quality of UMTS networks is adequate.

The exemplified national roaming agreement between operator A and operator B also provides, for instance, that the customers 2 of operator B are allowed to use the entire GSM network of operator A. However, they will not be allowed access to the UMTS section of the network 4 of operator A (even if the customers 2 of operator B, who are within the network of operator A, have a dual-mode UE which principally would support access to UMTS). Consequently, the exemplified roaming agreement specifies that customers 2 of operator B (or only a certain number of these customers) are prevented from accessing the UMTS network of operator A as illustrated by arrow 6 in FIG. 1.

For example, this can be achieved by inhibiting the attempt by a mobile terminal of a customer of operator B to access the UMTS network of operator A. In order to achieve this, operator A has his GSM/UMTS network configured in such a way that the cells of the GSM and UMTS networks each are in different location areas (LA) and every exchange from GSM to UMTS and UMTS to GSM initiates a location area update.

The core network of operator A now has the possibility to prevent, with a respective rejection code, the attempt of a customer of B to access, for example, the location areas which use UMTS technology (or even only a certain number) by rejecting the location area updates (LAU).

Present-day implementing of such rejection procedures allow for a distinction of mobile terminals, for instance, according to source (for example by means of IMSI). Thus, access can be allowed for customers of A, while customers of B are being rejected.

Consequently, prior art allows for a rejection of customer B—without UMTS access authorization—in the UMTS network of A, by rejecting LAU. However, since through configuration of cell-exchange-parameters all dual-mode-compatible mobile terminals in the areas in which operator A also has UMTS supply initiate cell exchange from GSM to UMTS (but only mobile terminals of operator A are allowed access in the target UMTS location areas), the rejected mobile terminals of operator B must abandon the cell exchange and remain in the original GSM cell. In this context it has to be taken into consideration that the first attempt to access is rejected through LAU reject from the target network (UMTS network of operator A). Further attempts to access of already rejected mobile terminals of operator B fail in that these LA in which the rejection took place are included in the "list of forbidden LA for roaming."

However, prior art requires of these mobile terminals that they continue to follow the cell exchange parameters in the original GSM cell and continue to measure radio technically potential target cells (including the configured UMTS cells of operator A). These requirements are defined in the technical specifications [TS45.008] for GSM and [3GPP TS25.304, TS25.133 and TS 25.331].

In brief, the basic disadvantage of prior art is the requirement of measuring the potential target cells according to the configuration on the radio channel of the active cell, EVEN if access to this target cell is PROHIBITED.

Consequently, in the scenario described a mobile terminal of operator B would remain in the GSM cells of operator A. However, according to the requirements in the above-mentioned specifications, it would continue to measure radio technically the UMTS target cells not suitable for this mobile terminal.

This requirement has significant negative effects on the operational times of the mobile terminal since the unnecessary measurements mean additional energy consumption for the mobile terminal.

Accordingly, the invention-based method suggests that a mobile terminal "memorizes" that access to a particular adjacent radio cell is not possible (for example, because the LAU in this cell has already been rejected). In addition to the "list of forbidden LA for roaming" mentioned above, a mobile terminal maintains an additional list in which, for instance, the cell identities of the cells ("Cell ID") or other characteristics which clearly identify an adjacent radio cell are recorded, in which an LAU failed, or in which the cells that a mobile terminal has measured, but that could not be used for a cell exchange because they belong to an LA which is included in the "list of forbidden LA for roaming." Examples for characteristics are, for instance, the frequency of an adjacent radio cell with GSM, the BSIC with a GSM adjacent radio cell, the scrambling code of an adjacent radio cell with UMTS, a carrier frequency with WLAN, a "SSID" with WLAN, etc. The invention-based method does not have any restriction regarding identity.

According to this, using the stored information, a mobile terminal could avoid the measurement of adjacent radio cells that are anyway not suitable candidates for cell exchange.

Consequently, through a restriction to actually possible adjacent radio cells, the mobile terminal could increase its operational times by avoiding unnecessary measurements.

As a result, in the preceding scenario, a mobile radio unit of customer B in the GSM network of operator A would follow cell exchange to UMTS. However there, because of access restrictions ("UMTS Las are not allowed for devices of B"), it would receive an LAU reject and subsequently exchange again to GSM.

With the invention-based method, all UMTS cells (which belong to the rejected/prohibited LA) could be discarded in the measurements to follow since a exchange is not allowed anyway.

The invention-based method provides a special advantage with stationary mobile terminals which remain below the prohibited UMTS supply of operator A and, consequently, can completely avoid the necessary measurements for a cell exchange to UMTS that is anyway ineffective.

In order to allow access into the now barred (UMTS) location areas, even after the access requirements have been exchanged, the invention-based method suggests that a mobile terminal memorizes the rejection of access only for a specific period of time (for example, 24 h or until it is switched off).

After disconnecting the mobile terminal, which has inhibited the measurements or identification procedures of not suitable target cells, the mobile terminal resumes the measurements or identification procedures of these target cells after being connected again.

This applies also if the mobile terminal has performed a cell exchange to another cell.

Otherwise, the mobile terminal would continue to be denied access to the (UMTS) LA even after the agreement between operators A and B has been exchanged because it would not resume on its own the measurements on the original target cell (unless other requirements for deleting the "list of forbidden LA for roaming" defined in [TS 24.008] are being fulfilled).

An application of the invention is possible not only for mobile terminals according to GSM or UMTS standards. It can also be applied to other radio network technologies (for example, Wireless LAN (W-LAN), cdma2000, WiMAX, WiBro, enhanced UTRAN, etc.

REFERENCE LIST

1. Customer PLMN A (dual mode UE)
2. Customer PLMN B (dual mode UE)
3. PLMN A (UMTS)—LA2
4. PLMN A (GSM)—LA1

5. Cell resection (reselection of a cell)
6. no access for PLMN B to UMTS

The invention claimed is:

1. A method for optimizing the operational times and cell exchange performance of mobile terminals in a mobile communication network having adjacent radio cells, comprising: under the control of a computer program having a program code stored in and executed in a mobile terminal operating in the mobile communication network, based on attempts by the mobile terminal to gain access to individual radio cells and having access rejected the terminal temporarily storing network specific characteristics for adjacent radio cells within a PLMN to which access has been denied and are therefore unsuitable for cell exchange when the mobile communication network is in operation and using said characteristics as decision criteria for cell exchange; the mobile terminal storing a plurality of lists of specific said unsuitable target radio cells in the PLMN to which attempted access by the mobile terminal has been denied, which prevents further measurements of such potential target radio cells of adjacent radio cells configured by a radio channel that are unsuitable candidates for cell exchange; the plurality of lists including a first list and a second list having different informational content than the first list, the first list including location area identities of forbidden location areas for roaming within the PLMN in which a location area update for an initiated cell exchange has been rejected, and the second list including identities of adjacent radio cells within the location areas of the PLMN in which a location area update failed or in which the radio cells that a mobile terminal has measured, but that could not be used for a cell exchange because they belong to a location area included on the first list of forbidden location areas for roaming; the mobile terminal using the different first and second lists to optimize operational time by avoiding unnecessary identification of adjacent radio cells in the PLMN, suppressing radio measurements and identification procedures of such unsuitable target cells on the first and second lists.

2. The method according to claim 1, wherein the mobile terminal functions according to any radio standard.

3. The method according to claim 2, wherein a cellular phone according to GSM or UMTS standard excludes from further radio measurements or identification procedures adjacent radio cells which belong to location areas in which it has already been rejected through a rejection of a "location area update."

4. The method according to claim 2, wherein a cellular phone according to GSM or UMTS standard excludes from further measurements or identification procedures adjacent radio cells which belong to routing areas in which it has already been rejected through a rejection of a "routing area update."

5. The method according to claim 1, wherein a cellular phone according to GSM or UMTS standard excludes from further measurements or identification procedures adjacent radio cells which belong to location areas in which such cells have already been rejected through a rejection of a "location area update."

6. The method according to claim 5, wherein the cellular phone excludes from further measurements or identification procedures adjacent radio cells which are included as being rejected in a "list of forbidden location areas for roaming."

7. The method according to claim 5, wherein a cellular phone according to GSM or UMTS standard excludes from further measurements or identification procedures adjacent radio cells which belong to routing areas in which it has already been rejected through a rejection of a "routing area update."

8. The method according to claim 1, wherein a cellular phone according to GSM or UMTS standard excludes from further radio measurements or identification procedures adjacent radio cells which belong to routing areas in which such cells have already been rejected through a rejection of a "routing area update."

9. The method according to claim 1, wherein a mobile terminal equipment according to WLAN standard excludes from further radio measurements or identification procedures (after having detected that they cannot be used) adjacent radio cells or access points which emit non-serviceable characteristics.

10. The method according to claim 9, wherein adjacent access points are emitted on a radio channel of a different radio technology.

11. The method according to claim 1, wherein a cellular phone according to GSM or UMTS standard excludes from further radio measurements or identification procedures adjacent radio cells which it has already detected as unsuitable for cell exchange since a target radio cell has been classified as a "barred cell."

12. The method according to claim 1, wherein a cellular phone according to GSM or UMTS standard excludes from further radio measurements adjacent radio cells which it has detected as unsuitable for cell exchange since a target radio cell has been classified as reserved for "operator reserved cell."

13. The method according to claim 1, wherein the mobile terminal, after it has inhibited the radio measurements of unsuitable target radio cells, will resume the measurement of these target radio cells after a definite period of time has elapsed.

14. The method according to claim 1, wherein the mobile terminal, after it has inhibited the radio measurements and identification procedures of unsuitable target radio cells, will resume the measurement or identification procedures of these target radio cells after the mobile terminal has been switched off and on again.

15. The method according to claim 1, wherein the mobile terminal, after it has inhibited the measurements or identification procedures of unsuitable target radio cells, will resume the measurement or identification procedures of these target radio cells after the mobile terminal has performed a cell exchange to a different radio cell.

16. The method according to claim 1, wherein the mobile terminal, after it has inhibited the measurements or identification procedures of unsuitable target radio cells, will resume the measurement or identification procedures of these target radio cells after the mobile terminal has received from the mobile network a dedicated message to measure these target radio cells.

17. The method according to claim 1, which method involves an arrangement for optimizing the operational times and cell exchange performance of mobile terminals in a mobile communication network having adjacent radio cells and the mobile terminal has at least one storage unit and/or one data processing unit which, during operation in the mobile communication network, stores and processes the data of the measurements and identification procedures performed.

18. The method according to claim 1, wherein the first and second lists of unsuitable target cells are maintained by the mobile terminal only for a specific period of time or under specific conditions.

* * * * *